US008170186B2

(12) United States Patent
Kuiken

(10) Patent No.: US 8,170,186 B2
(45) Date of Patent: May 1, 2012

(54) ELECTRONIC DEVICE WITH MOTION CONTROLLED FUNCTIONS

(75) Inventor: Martijn Kuiken, Veendam (NL)

(73) Assignee: Sony Mobile Communications AB, Lund (SE)

( * ) Notice: Subject to any disclaimer, the term of this patent is extended or adjusted under 35 U.S.C. 154(b) by 1059 days.

(21) Appl. No.: 12/098,514

(22) Filed: Apr. 7, 2008

(65) Prior Publication Data

US 2009/0252311 A1 Oct. 8, 2009

(51) Int. Cl.
*H04M 11/00* (2006.01)

(52) U.S. Cl. .................................. 379/102.02; 455/90.2

(58) Field of Classification Search .... 348/14.01–14.08; 701/200; 455/90.02
See application file for complete search history.

(56) References Cited

U.S. PATENT DOCUMENTS

| | | | | |
|---|---|---|---|---|
| 5,226,091 | A | 7/1993 | Howell et al. | |
| 6,157,731 | A | 12/2000 | Hu et al. | |
| 6,188,392 | B1 | 2/2001 | O'Connor et al. | |
| 6,351,634 | B1 | 2/2002 | Shin | |
| 6,374,177 | B1 * | 4/2002 | Lee et al. | 701/516 |
| 6,985,643 | B1 | 1/2006 | Fahraeus et al. | |
| 7,054,487 | B2 | 5/2006 | Ericson et al. | |
| 7,176,886 | B2 | 2/2007 | Marvit et al. | |
| 2003/0103091 | A1 | 6/2003 | Wong et al. | |
| 2004/0087326 | A1 | 5/2004 | Dunko et al. | |
| 2004/0090423 | A1 | 5/2004 | Bisset | |
| 2004/0095384 | A1 | 5/2004 | Avni et al. | |
| 2004/0139217 | A1 | 7/2004 | Kidney et al. | |
| 2004/0181703 | A1 | 9/2004 | Lilja et al. | |
| 2004/0218104 | A1 * | 11/2004 | Smith et al. | 348/734 |
| 2005/0059435 | A1 | 3/2005 | McKee et al. | |
| 2005/0101314 | A1 | 5/2005 | Levi | |
| 2005/0198029 | A1 | 9/2005 | Pohja et al. | |
| 2005/0212749 | A1 | 9/2005 | Marvit et al. | |
| 2005/0212750 | A1 | 9/2005 | Marvit et al. | |
| 2005/0212753 | A1 * | 9/2005 | Marvit et al. | 345/156 |
| 2005/0212767 | A1 | 9/2005 | Marvit et al. | |
| 2005/0212911 | A1 | 9/2005 | Marvit et al. | |
| 2005/0222801 | A1 | 10/2005 | Wulff et al. | |
| 2005/0250552 | A1 | 11/2005 | Eagle et al. | |
| 2006/0005156 | A1 | 1/2006 | Korpipaa et al. | |

(Continued)

FOREIGN PATENT DOCUMENTS

| | | |
|---|---|---|
| DE | 10 2004 061 169 | 6/2006 |

(Continued)

OTHER PUBLICATIONS

International Search Report and Written Opinion from corresponding International Application No. PCT/IB08/002651.

(Continued)

*Primary Examiner* — Curtis Kuntz
*Assistant Examiner* — Maria El-Zoobi
(74) *Attorney, Agent, or Firm* — Renner, Otto, Boisselle & Sklar, LLP

(57) ABSTRACT

An electronic device may be controlled with a remote control device. The remote control device may be moved in a first manner to cause the electronic device to scroll through an ordered sequence. The remote control device may be moved in a second manner to cause the electronic device to select an entry from the ordered list. During scrolling of the ordered sequence, audio feedback regarding the nature of an associated entry may be provided to the user.

16 Claims, 3 Drawing Sheets

U.S. PATENT DOCUMENTS

| | | | |
|---|---|---|---|
| 2006/0052109 A1 | 3/2006 | Ashman et al. | |
| 2006/0092866 A1 | 5/2006 | Kim et al. | |
| 2006/0107213 A1 | 5/2006 | Kumar et al. | |
| 2006/0199605 A1 | 9/2006 | Lin | |
| 2006/0256074 A1 | 11/2006 | Krum et al. | |
| 2007/0021073 A1* | 1/2007 | Gratton | 455/90.2 |
| 2007/0159452 A1* | 7/2007 | Basche et al. | 345/156 |

FOREIGN PATENT DOCUMENTS

| | | |
|---|---|---|
| EP | 1 132 933 | 9/2001 |
| EP | 1335338 | 8/2003 |
| GB | 2 347 593 | 9/2000 |
| GB | 2 419 433 | 4/2006 |
| WO | 2004/062131 | 7/2004 |
| WO | 2004/075169 | 9/2004 |
| WO | 2005/076542 | 8/2005 |
| WO | 2005/093550 | 10/2005 |
| WO | 2005/109847 | 11/2005 |
| WO | 2006088273 | 8/2006 |
| WO | 2006/127270 | 11/2006 |

OTHER PUBLICATIONS

International Search Report and Written Opinion from International Application No. PCT/IB07/000120.

International Preliminary Report on Patentability from corresponding International Application No. PCT/IB08/002651.

* cited by examiner

ELECTRONIC DEVICE WITH MOTION CONTROLLED FUNCTIONS

TECHNICAL FIELD OF THE INVENTION

The technology of the present disclosure relates generally to electronic devices, such as mobile telephones. More particularly, the technology of the present disclosure relates to a system and method for controlling functions of an electronic device by moving a remote control device.

BACKGROUND

Mobile wireless electronic devices are becoming increasingly popular. For example, mobile telephones, portable media players and portable gaming devices are now in widespread use. Unfortunately, conventional mobile telephones are not very convenient to use while driving in a vehicle. For example, selecting an entry in a contact list for purposes of initiating a telephone call is difficult and may be distracting to driving tasks. Some jurisdictions have even enacted legislation to limit or forbid the holding of a mobile telephone while driving. One attempt to overcome these issues is to use voice commands to control a mobile telephone while driving. The voice commands may be transmitted through a wireless handsfree headset, for example. However, voice command dialing only allows the user to name a specific individual (or place) to be called.

SUMMARY

To improve control of an electronic device, the present disclosure describes a system and method for remotely controlling an electronic device using movement of the remote controller. In one embodiment, movements of the remote controller may be used to navigate through a contact list and initiate a call to a contact list entry that the user selects. Other functions may be controlled in a similar manner, such as selecting a song from a playlist to playback and controlling a navigation function that outputs directions to a specified destination.

In one embodiment, a remote control device is used to control the electronic device. For example, the remote control device may be a user-wearable device in the form of a watch or a bracelet. The remote control device may have motion detectors (e.g., accelerometers) that sense movement of the user's arm. Movements in one direction may signify a command to scroll through a list or menu, and movement in another direction may signify an enter or select command. While using the remote control device, the electronic device may provide audio feedback to the user to assist in navigating a menu or list. The use of audio feedback may minimize the need for the user to look at the electronic device, thereby the allowing the user to look in another direction (e.g., look at a road upon which the user is driving). Also, the movements may be performed with one hand while the other hand is engaged in another activity, such as holding a steering wheel of a vehicle. Therefore, the described techniques may be particularly useful when the user is driving a vehicle or in situations when the electronic device may not be controlled by physical interaction between the user and the electronic device (e.g., the user touching buttons or a touch sensitive surface).

According to one aspect of the disclosure, an electronic device includes a local wireless interface to receive control inputs from a remote control device, the control inputs including a scroll control input corresponding to a first movement of the remote control device and a select control input corresponding to a second movement of the remote control device; and a controller that interprets the control inputs and controls the electronic device to carry out a function corresponding to the received control inputs such that at least one scroll control input prompts the controller to scroll through an ordered sequence of entries to increment a corresponding entry value and audibly output feedback as the entries are incremented.

According to one embodiment of the electronic device, the at least one received scroll control input prompts the controller to scroll through alphanumeric characters to increment a character value and audibly output corresponding character value feedback as the character value is incremented.

According to one embodiment of the electronic device, a received select control input prompts the controller to select a current character value.

According to one embodiment of the electronic device, the electronic device includes call circuitry to establish a call over a network and, in a calling mode, a received select control input prompts the controller to enter a contact list at a point that corresponds to a current character value.

According to one embodiment of the electronic device, at least one additional scroll control inputs prompt the controller to scroll through entries of the contact list and audibly output a name associated with a current contact list entry as the contact list entries are incremented, and receipt of another select control input prompts the controller to initiate a call to a telephone number associated with the selected contact list entry.

According to one embodiment of the electronic device, the electronic device includes an audio playback function and, in a playback mode, a received select control input prompts the controller to enter one of a playlist, a song list or an artist list at a point that corresponds to a current character value.

According to one embodiment of the electronic device, at least one additional scroll control inputs prompt the controller to scroll through entries of the playlist, the song list or the artist list and audibly output a name associated with a current list value as the entries are incremented, and receipt of another select control input prompts the controller to play an audio file associated with the selected entry.

According to one embodiment of the electronic device, received scroll and select control inputs control a navigation function that provides directions to a user-specified destination.

According to one embodiment of the electronic device, received scroll and select control inputs are used to navigate through a hierarchical menu interface of the electronic device, and the at least one scroll control input prompts an increment through a list of menu options and audible output of feedback data as increments are made through the list.

According to one embodiment of the electronic device, the remote control device is worn on an arm or hand of a user.

According to one embodiment of the electronic device, the remote control device includes one or more motion sensors for detecting motion of the remote control device; a controller that generates the scroll control input in response to detection of a first movement of the remote control device by the one or more motion sensors and the select control input in response to detection of a second movement of the remote control device by the one or more motion sensors; and a local wireless interface that transmits the scroll control input and the select control input to the electronic device.

According to one embodiment of the electronic device, audible outputs in response to received control inputs are played to a user through one of a speaker of the electronic device, a headset or a vehicle audio system.

According to another aspect of the disclosure, a remote control device for controlling an operational function of an electronic device includes one or more motion sensors for detecting motion of the remote control device; a controller that generates a scroll control input for the electronic device in response to detection of a first movement of the remote control device by the one or more motion sensors and a select control input for the electronic device in response to detection of a second movement of the remote control device by the one or more motion sensors; and a local wireless interface that transmits the scroll control input and the select control input to the electronic device.

According to one embodiment of the remote control device, the scroll and select control inputs are used to control navigation through a contact list and initiate a call to a telephone number associated with an entry from the contact list.

According to one embodiment of the remote control device, the scroll and select control inputs are used to control navigation through one of a playlist, a song list or an artist list and control playback of a selected entry from the playlist, the song list or the artist list.

According to one embodiment of the remote control device, the scroll and select control inputs are used to control operation of a navigation function of the electronic device.

According to one embodiment of the remote control device, the remote control device is worn on an arm or hand of a user.

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Features that are described and/or illustrated with respect to one embodiment may be used in the same way or in a similar way in one or more other embodiments and/or in combination with or instead of the features of the other embodiments.

DETAILED DESCRIPTION OF EMBODIMENTS

Figure 1:
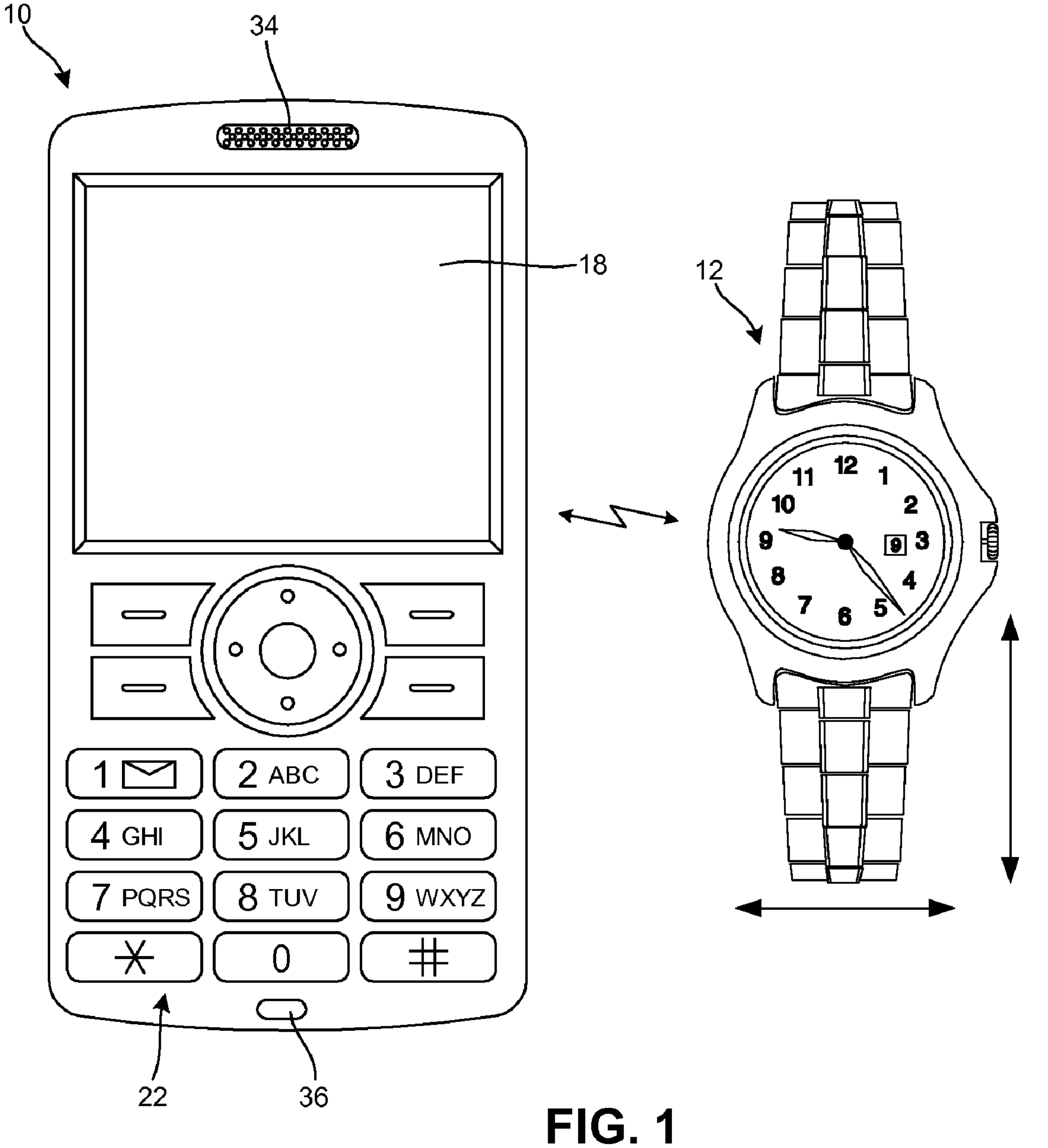
FIG. 1 is a schematic view of a mobile telephone as an exemplary electronic device and a wrist watch as an exemplary remote control device.

Embodiments will now be described with reference to the drawings, wherein like reference numerals are used to refer to like elements throughout. It will be understood that the figures are not necessarily to scale.

In the present document, embodiments are described primarily in the context of a mobile telephone. It will be appreciated, however, that the exemplary context of a mobile telephone is not the only operational environment in which aspects of the disclosed systems and methods may be used. Therefore, the techniques described in this document may be applied to any type of appropriate electronic device, examples of which include a mobile telephone, a media player, a gaming device, a computer, a pager, a communicator, an electronic organizer, a personal digital assistant (PDA), a smartphone, a portable communication apparatus, etc.

Referring initially to FIG. 1, an exemplary electronic device 10 is shown. As indicated, the exemplary electronic device 10 is a mobile telephone. The electronic device may be controlled using a remote control device 12 that has a wireless interface with the electronic device 10. In the illustrated embodiment, the remote control device 12 is a wrist watch with working time keeping components. In other exemplary embodiments, the remote control device 12 may be a bracelet, an elastic wrist or arm band, a wrist or arm band that is secured with a hole-and-loop fastener (e.g., VELCRO), a ring or other device that may be worn by the user and move with motion of a corresponding portion of the user. It will be appreciated that the remote control device 12 may be worn on a portion of the user other than the arm or hand, although the arm and/or hand are capable of moving in manners that are readily convertible into distinguishable command signals.

Figure 2:
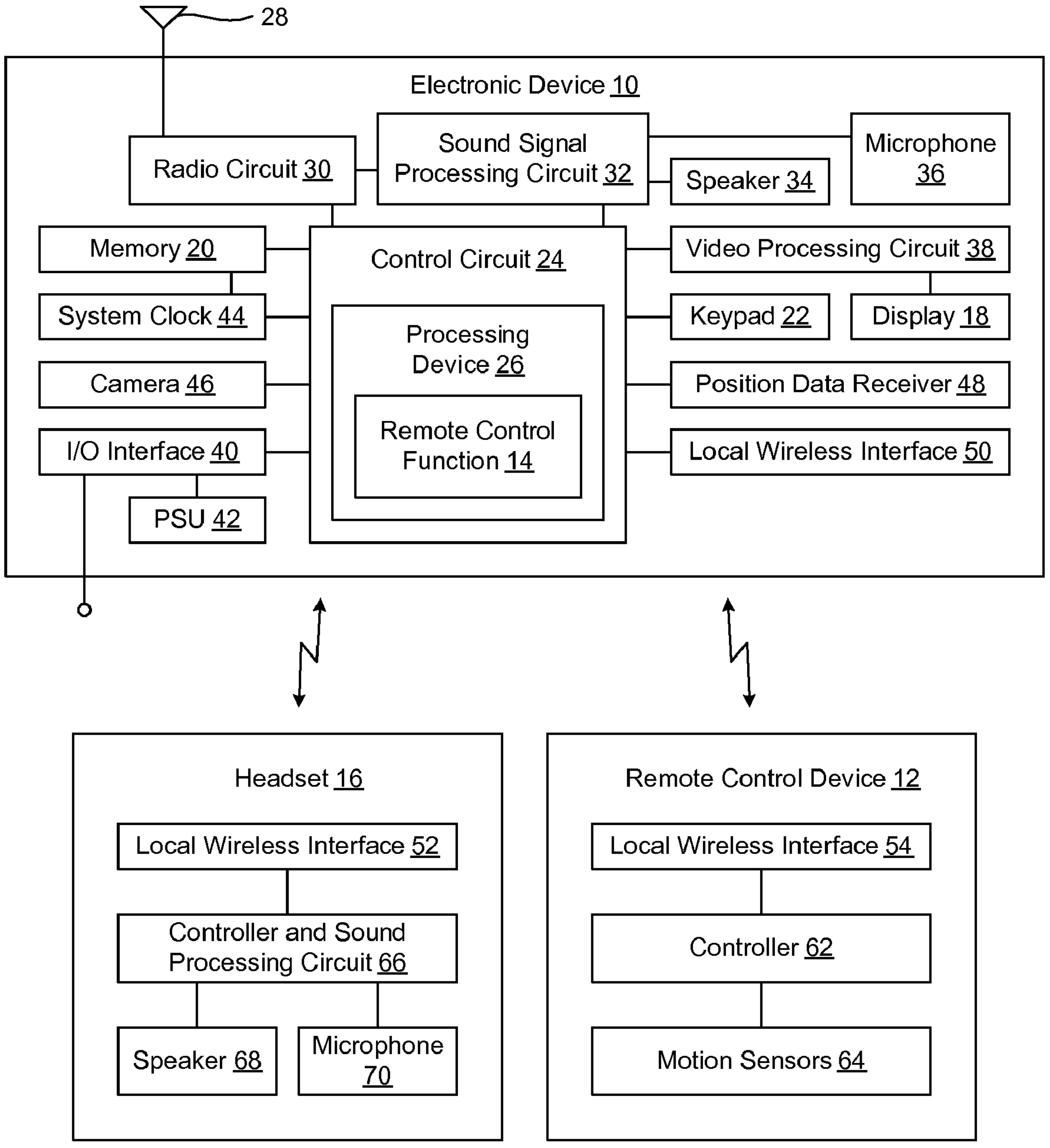
FIG. 2 is a schematic block diagram of the electronic device and the remote control device of FIG. 1, together with a wireless headset.

With additional reference to FIG. 2, the exemplary electronic device 10 may include a remote control function 14 that is configured to control the electronic device 10 in accordance with command signals received from the remote control device 12. Additional details and operation of the remote control function 14 will be described in greater detail below. The remote control function 14 may be embodied as executable code that is resident in and executed by the electronic device 10. In one embodiment, the remote control function 14 may be a program stored on a computer or machine readable medium. The remote control function 14 may be a stand-alone software application or form a part of a software application that carries out additional tasks related to the electronic device 10.

In the illustrated embodiment, the electronic device 10 may interface with a headset 16, such a wireless personal hands-free (PHF) device. The headset 16 may play sounds to the user, such as sounds corresponding to an incoming voice signal during a telephone call. Also, audio feedback may be provided to the user through the headset 16 during control of the electronic device 10 with the remote control device 12. In other situations, this audio information may be played to the user through a speaker phone feature of the electronic device 10 or through an audio system of a vehicle.

Before describing operational interaction of the electronic device 10, the remote control device 12 and the headset 16, an exemplary construction of these devices will be described. The electronic device 10 is shown as having a "brick" or "block" form factor housing, but it will be appreciated that other housing types may be utilized, such as a "flip-open" form factor (e.g., a "clamshell" housing), a slide-type form factor (e.g., a "slider" housing) and/or a pivoting form factor.

The electronic device 10 may include a display 18. The display 18 displays information to a user such as operating state, time, telephone numbers, contact information, various menus, etc., that enable the user to utilize the various features of the electronic device 10. The display 18 also may be used to visually display content received by the electronic device 10 and/or retrieved from a memory 20 of the electronic device 10. The display 18 may be used to present images, video and other graphics to the user, such as photographs, mobile television content and video associated with games.

A keypad 22 provides for a variety of user input operations. For example, the keypad 22 may include alphanumeric keys for allowing entry of alphanumeric information such as telephone numbers, phone lists, contact information, notes, text, etc. In addition, the keypad 22 may include special function keys such as a "call send" key for initiating or answering a call, and a "call end" key for ending or "hanging up" a call. Special function keys also may include menu navigation and select keys to facilitate navigating through a menu displayed on the display 18. For instance, a pointing device and/or navigation keys may be present to accept directional inputs from a user. Special function keys may include audiovisual content playback keys to start, stop and pause playback, skip or repeat tracks, and so forth. Other keys associated with the mobile telephone may include a volume key, an audio mute key, an on/off power key, a web browser launch key, a camera key, etc. Keys or key-like functionality also may be embodied as a touch screen associated with the display 18. Also, the display 18 and keypad 22 may be used in conjunction with one another to implement soft key functionality.

The electronic device 10 includes call circuitry that enables the electronic device 10 to establish a call and/or exchange signals with a called/calling device, which typically may be another mobile telephone or landline telephone. However, the called/calling device need not be another telephone, but may be some other device such as an Internet web server, content providing server, etc. Calls may take any suitable form. For example, the call could be a conventional call that is established over a cellular circuit-switched network or a voice over Internet Protocol (VoIP) call that is established over a packet-switched capability of a cellular network or over an alternative packet-switched network, such as WiFi (e.g., a network based on the IEEE 802.11 standard), WiMax (e.g., a network based on the IEEE 802.16 standard), etc. Another example includes a video enabled call that is established over a cellular or alternative network.

The electronic device 10 may be configured to transmit, receive and/or process data, such as text messages, instant messages, electronic mail messages, multimedia messages, image files, video files, audio files, ring tones, streaming audio, streaming video, data feeds (including podcasts and really simple syndication (RSS) data feeds), Internet content, and so forth. It is noted that a text message is commonly referred to by some as "an SMS," which stands for simple message service. SMS is a typical standard for exchanging text messages. Similarly, a multimedia message is commonly referred to by some as "an MMS," which stands for multimedia message service. MMS is a typical standard for exchanging multimedia messages. Processing data may include storing the data in the memory 20, executing applications to allow user interaction with the data, displaying video and/or image content associated with the data, outputting audio sounds associated with the data, and so forth.

The electronic device 10 includes a primary control circuit 24 that is configured to carry out overall control of the functions and operations of the electronic device 10. The control circuit 24 may include a processing device 26, such as a central processing unit (CPU), microcontroller or microprocessor. The processing device 26 executes code stored in a memory (not shown) within the control circuit 24 and/or in a separate memory, such as the memory 20, in order to carry out operation of the electronic device 10. The memory 20 may be, for example, one or more of a buffer, a flash memory, a hard drive, a removable media, a volatile memory, a non-volatile memory, a random access memory (RAM), or other suitable device. In a typical arrangement, the memory 20 may include a non-volatile memory (e.g., a NAND or NOR architecture flash memory) for long term data storage and a volatile memory that functions as system memory for the control circuit 24. The volatile memory may be a RAM implemented with synchronous dynamic random access memory (SDRAM), for example. The memory 20 may exchange data with the control circuit 24 over a data bus. Accompanying control lines and an address bus between the memory 20 and the control circuit 24 also may be present.

In addition, the processing device 26 may execute code that implements the remote control function 14. It will be apparent to a person having ordinary skill in the art of computer programming, and specifically in application programming for mobile telephones or other electronic devices, how to program a electronic device 10 to operate and carry out logical functions associated with the remote control function 14. Accordingly, details as to specific programming code have been left out for the sake of brevity. Also, while the remote control function 14 is executed by the processing device 26 in accordance with an embodiment, such functionality could also be carried out via dedicated hardware or firmware, or some combination of hardware, firmware and/or software.

Continuing to refer to FIGS. 1 and 2, the electronic device 10 includes an antenna 28 coupled to a radio circuit 30. The radio circuit 30 includes a radio frequency transmitter and receiver for transmitting and receiving signals via the antenna 28. The radio circuit 30 may be configured to operate in a mobile communications system and may be used to send and receive data and/or audiovisual content. Receiver types for interaction with a mobile radio network and/or broadcasting network include, but are not limited to, global system for mobile communications (GSM), code division multiple access (CDMA), wideband CDMA (WCDMA), general packet radio service (GPRS), WiFi, WiMax, digital video broadcasting-handheld (DVB-H), integrated services digital broadcasting (ISDB), etc., as well as advanced versions of these standards. It will be appreciated that the antenna 28 and the radio circuit 30 may represent one or more than one radio transceiver.

The electronic device 10 further includes a sound signal processing circuit 32 for processing audio signals transmitted by and received from the radio circuit 30. Coupled to the sound processing circuit 32 are a speaker 34 and a microphone 36 that enable a user to listen and speak via the electronic device 10. The radio circuit 30 and sound processing circuit 32 are each coupled to the control circuit 30 so as to carry out overall operation. Audio data may be passed from the control circuit 24 to the sound signal processing circuit 32 for playback to the user. The audio data may include, for example, audio data from an audio file stored by the memory 20 and retrieved by the control circuit 24, or received audio data such as in the form of streaming audio data from a mobile radio service. The sound processing circuit 32 may include any appropriate buffers, decoders, amplifiers and so forth.

The display 18 may be coupled to the control circuit 24 by a video processing circuit 38 that converts video data to a video signal used to drive the display 18. The video processing circuit 38 may include any appropriate buffers, decoders, video data processors and so forth. The video data may be generated by the control circuit 24, retrieved from a video file that is stored in the memory 20, derived from an incoming video data stream that is received by the radio circuit 30 or obtained by any other suitable method.

The electronic device 10 may further include one or more input/output (I/O) interface(s) 40. The I/O interface(s) 40 may be in the form of typical mobile telephone I/O interfaces and may include one or more electrical connectors. As is typical, the I/O interface(s) 40 may be used to couple the electronic device 10 to a battery charger to charge a battery of a power supply unit (PSU) 42 within the electronic device 10. In addition, or in the alternative, the I/O interface(s) 40 may serve to connect the electronic device 10 to a headset assembly (e.g., a personal handsfree (PHF) device) that has a wired interface with the electronic device 10. Further, the I/O interface(s) 40 may serve to connect the electronic device 10 to a personal computer or other device via a data cable for the exchange of data. The electronic device 10 may receive operating power via the I/O interface(s) 40 when connected to a vehicle power adapter or an electricity outlet power adapter. The PSU 42 may supply power to operate the electronic device 10 in the absence of an external power source.

The electronic device 10 also may include a system clock 44 for clocking the various components of the electronic device 10, such as the control circuit 24 and the memory 20.

The electronic device 10 may include a camera 46 for taking digital pictures and/or movies. Image and/or video files corresponding to the pictures and/or movies may be stored in the memory 20.

The electronic device 10 also may include a position data receiver 48, such as a global positioning system (GPS) receiver, Galileo satellite system receiver or the like. The position data receiver 48 may be involved in determining the location of the electronic device 10. The position may be used as an input to a navigation function of the electronic device 10.

The electronic device 10 also may include a local wireless interface 50, such as an infrared transceiver and/or an RF interface (e.g., a Bluetooth interface), for establishing communication with an accessory, another mobile radio terminal, a computer or another device. For example, the local wireless interface 50 may operatively couple the electronic device 10 to the headset 16 and/or the remote control device 12. For this purpose, the headset 16 may include a corresponding local wireless interface 52 and the remote control device 12 may include a corresponding local wireless interface 54.

Figure 3:
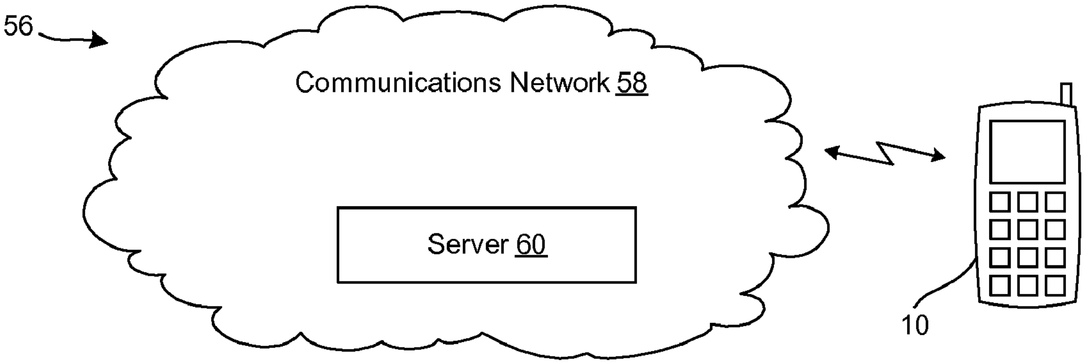
FIG. 3 is a schematic diagram of a communications system in which the electronic device of FIG. 1 may operate.

With additional reference to FIG. 3, the electronic device 10 may be configured to operate as part of a communications system 56. The system 56 may include a communications network 58 having a server 60 (or servers) for managing calls placed by and destined to the electronic device 10, transmitting data to the electronic device 10 and carrying out any other support functions. The server 60 communicates with the electronic device 10 via a transmission medium. The transmission medium may be any appropriate device or assembly, including, for example, a communications tower (e.g., a cell tower), another mobile telephone, a wireless access point, a satellite, etc. Portions of the network may include wireless transmission pathways. The network 58 may support the communications activity of multiple electronic devices 10 and other types of end user devices. As will be appreciated, the server 60 may be configured as a typical computer system used to carry out server functions and may include a processor configured to execute software containing logical instructions that embody the functions of the server 60 and a memory to store such software.

With continued reference to FIGS. 1 and 2, the remote control device 12 may include a controller 62 that controls operation of the remote control device 12. Control operations of the remote control device 12 may include interfacing with the electronic device 10 over the local wireless interface 54. In particular, control signals may be transmitted from the remote control device 12 to the electronic device 10. The control signals may be generated by moving the remote control device 12, such as with the use of a variety of arm and/or hand gestures. To detect movement of the remote control device 12, the remote control device 12 may include one or more motion sensors 64. The motion sensors 64 may be implemented with accelerometers. Signals generated by the motion sensors 64 may be input to the controller 62, which analyzes the signals to generate the control signals. The control signals also may be referred to as control inputs to the electronic device 10.

In one embodiment, a control sequence may be initiated when the user taps the remote control device 12 with a free hand of the user (e.g., in the illustrated embodiment, the hand that is not associated with the arm that is wearing the remote control device 12). During the tapping or other initiating motion, the hand associated with the arm that is wearing the remote control device 12 may be engaged in an activity, such as holding a steering wheel of a vehicle. The exemplary tapping motion alternatively may be created by moving the arm that is wearing the remote control device 12 to strike the remote control device 12 against an object. In still other situations, the initiating action may be a movement other than tapping, such as moving the remote control device 12 in a circle.

Another exemplary control motion may be a vertical movement of the remote control device 12 as illustrated by the vertical arrow in FIG. 1. For instance, a downward movement (which may or may not be followed by a return upward movement) may command forward scrolling through a list or other sequence (e.g., the alphabet). Similarly, an upward movement (which may or may not be followed by a return downward movement) may command backward scrolling through a list or other sequence. Another exemplary control motion may be a horizontal movement of the remote control device 12 as illustrated by the horizontal arrow in FIG. 1. Horizontal movement may be used, for example, to command the selection of an entry from a list or other sequence (e.g., select a letter from the alphabet, a name from a contact list, a song from a playlist, etc.). These exemplary scroll and select command motions may be carried out by moving the user's arm that is wearing the remote control device 12. During these motions, the user may engage in another activity with the user's other arm and hand, such as hold the steering wheel of a vehicle. It will be appreciated that other movements may be associated with an initiation command, a scrolling command, a selection command and/or other commands. Also, motions described as being associated with one of the commands may instead be used for a different one of the commands.

The headset 16 may be arranged in a typical manner for a headset. For example, the local wireless interface 52 (or a wired interface to the electronic device 10) may be controlled by a controller and sound processing circuit 66 to exchange audio signals with the electronic device 10. In the audio signal received from the electronic device 10 may be played to the user using a speaker 68. A microphone 70 may be used to detect speech of the user and signal containing a representation of the user's speech may be communicated to the electronic device 10.

Figure 4:
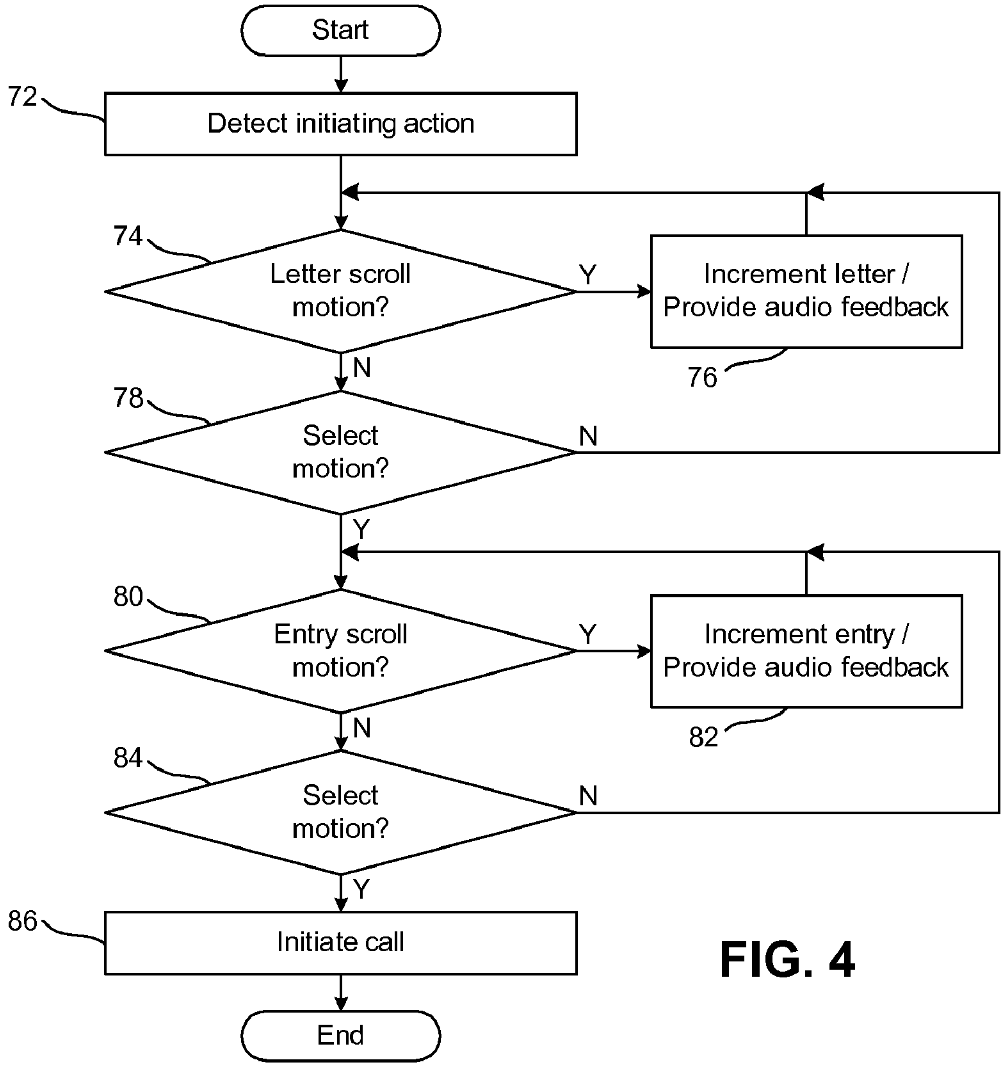
FIG. 4 is a flow chart representing an exemplary method of remotely controlling the electronic device with the remote control device.

With additional reference to FIG. 4, illustrated are logical operations to implement an exemplary method of controlling the electronic device 10. Portions of the method may be carried out by executing an embodiment of the remote control function 14, for example. Thus, the flow chart of FIG. 4 may be thought of as depicting steps of a method carried out by the electronic device 10 in association with the remote control device 12 and, in some embodiments, the headset 16. Although FIG. 4 shows a specific order of executing functional logic blocks, the order of executing the blocks may be changed relative to the order shown. Also, two or more blocks shown in succession may be executed concurrently or with partial concurrence. Certain blocks also may be omitted.

The method will be described in the context of selecting a contact list entry to which a call is placed. It will be appreciated that the described control techniques function as a means of user interface with the electronic device 10 to control various navigation functions. As a result, the described control techniques may be used to control a variety of operations of the electronic device 10 in addition to initiating a call to a selected contact list entry. For instance, the described control techniques may be used to navigate through a playlist and select a particular audio file for playback. The described techniques also may be used to alphabetically scan through song titles or artist's names to find one or more associated audio files for playback. In addition, playback operations (e.g., play, stop, pause, resume, repeat, skip, etc.) may be controlled using the described techniques. As another example, the disclosed control techniques may be used to control a navigation function of the electronic device 10.

The logical flow for the method may begin in block 72 where an initiating action is detected by the remote control device 12. A signal indicative of the initiating action may be transmitted to the electronic device 10 for processing by the remote control function 14. The remote control function 14 (or programming of the controller 62) may recognize the signal corresponding to the initiating action as a user input indicating that the user wants to start a control operation with the electronic device. The initiating action may be, for example, a tapping of the remote control device 12 as described above. In response to detection of the initiating action by the remote control device 12, a corresponding signal (e.g., a control input) may be transmitted to the electronic device 10. Upon receipt of such a control input, the electronic device 10 may commence a control operation.

As indicated, the control operation described in the illustrated exemplary embodiment is the selection of a contact list entry so that a call may be placed to a telephone number associated with the selected contact list entry. In addition to commencing the control operation, the user may be provided with feedback indicating that the control operation has started. For example, an audio signal may be output to the headset 16 that plays the audio signal to the user. The content of the audio signal may describe the initiation of the control operation. In the illustrated example of selecting a contact list entry to call, the content may be a voice that says "contact selection initiated," or similar feedback.

Following block 72, the logical flow may proceed to block 74. In block 74, a determination may be made as to whether a scrolling motion is detected. The scrolling motion may be, for example, the upward or downward motion as described above. At this point in the logical flow, a scrolling motion may be associated with scrolling through an alphabet to assist the user enter into the contact list at a location that is close to the desired contact list entry. For instance, of the user is interested in calling a person having a name that begins with "S," scrolling first to the letter "S" and then to the desired name may be more efficient than alphabetically scrolling through the entire contact list starting with the first entry. In other embodiments, the scrolling may scroll through the contact list directly or may first scroll through an abbreviated contact list of commonly called individuals that has been associated with remote control of the electronic device 10.

If a positive determination is made in block 74, the logical flow may proceed to block 76. In block 76, and in response to detection of the scroll motion by the remote control device 12, a corresponding signal (e.g., a control input) may be transmitted to the electronic device 10. Receipt of such a control input prompts the letter of the alphabet to be incremented. For instance, in an English language application, a first forward scroll motion may increment a current character value to the letter "A." A subsequent forward scroll motion may increment the current character value to the letter "B." This process may continue through the letter "Z." Following the letter "Z," an additional forward scroll motion may increment the current character value back to the letter "A" or to a number (e.g., scrolling through alphanumeric characters may include scrolling through the letters "A" to "Z" and then through the numbers "0" through "9").

In addition to incrementing a current character value, the current character value that results from the scroll motion of block 74 may be audibly output to the user so that the user is aware of which letter (or number) is currently "active." Following block 76, the logical flow may return to block 74 to determine if a subsequent scroll motion is made by the user. As a example, if the user wants to call a telephone number associated with a contact list entry having the name "Clara," the user may make forward scroll motions until the letter "C" is announced. Backward scroll motions in block 74 may allow the user to reverse the progression through the order of character values. In one embodiment, text to speech software may be used to read the current character value to the user. In other embodiments, an audio file may be associated with each value and the audio file corresponding to the current character value is played to the user to identify the active character value.

If a scroll motion is not detected in block 74, the logical flow may proceed to block 78. In block 78, a determination may be made as to whether the user has made a select motion with the remote control device 12. The select motion may be, for example, the horizontal motion as described above. If a select motion is not detected in block 78 the logical flow may return to block 74 to wait for detection of a scroll motion or a select motion.

If a select motion is detected in block 78, a positive determination may be made and the logical flow may proceed to block 80. Also, in response to detection of the select motion by the remote control device 12, a corresponding signal (e.g., a control input) may be transmitted to the electronic device 10. Following the example of attempting to call the telephone number for the "Clara" contact list entry, when the letter "C" is announced, the user may then make the select motion to result in a positive determination in block 78.

In block 80, a determination may be made as to whether a scrolling motion command is detected (e.g., the upward or downward motion described above). At this point in the logical flow, a scrolling motion command may be associated with scrolling through the contact list. For instance, if "C" was the selected letter, the scrolling may start with the first "C" entry from the contact list, followed by the second "C" entry from the contact list and so forth until there are no more "C" entries. When there are no more "C" entries, the scrolling may advance to "D" entries and so forth.

If a positive determination is made in block 80, the logical flow may proceed to block 82. In block 82, and in response to detection of the scroll motion by the remote control device 12, a corresponding signal (e.g., a control input) may be transmitted to the electronic device 10. Receipt of such a control input prompts the current list value to be incremented. For instance, following the example of calling "Clara" and where the user has the entries "Cassandra," "Charles," "Christian" and "Clara" in the user's contact list, a first forward scroll motion may increment a current entry from the list to the first "C" entry in alphabetical order, which would be "Cassandra" in the example. A subsequent forward scroll motion may increment the current list value to the next alphabetically ordered contact list entry, which would be "Charles" in the example. This process may continue through the user's contact list entries. Backward scroll motions in block 80 may allow the user to reverse the progression through the order of entries in the contact list.

In addition to incrementing a current list value, the name associated with the current list value may be audibly output to the user so that the user is aware of which contact list entry is currently "active." In one embodiment, text to speech software may be used to read the name of the active contact list entry to the user. In other embodiments, a user generated audio file may be associated with each entry and the audio file corresponding to the current list value is played to the user to identify the active contact list entry.

Following block 82, the logical flow may return to block 80 to determine if a subsequent scroll motion is made by the user. Following the example, the user may make forward scroll motions until the name "Clara" is announced.

If a scroll motion is not detected in block 80, the logical flow may proceed to block 84. In block 84, a determination may be made as to whether the user has made a select motion with the remote control device 12. If a select motion is not detected in block 84 the logical flow may return to block 80 to wait for detection of a scroll motion or a select motion.

If a select motion is detected in block 84, a positive determination may be made and the logical flow may proceed to block 86. Following the example of attempting to call the telephone number for the Clara contact list entry, when the name "Clara" is announced the user may then make the select motion to result in a positive determination in block 84. In block 86, and in response to detection of the select motion by the remote control device 12, a corresponding signal (e.g., a control input) may be transmitted to the electronic device 10. Receipt of such a control input prompts a call to be initiated to the telephone number associated with the contact list entry for "Clara." In one embodiment, the select motion for block 84 may be the same motion used to initiate the control operation (e.g., in the above-described embodiment, this motion may be tapping of the remote control device 12), may be the same as the select motion of block 78, or may be a different select motion.

In another embodiment, if multiple telephone numbers are associated with the selected contact list entry, the user may scroll through the possible telephone numbers while names for those numbers are announced (e.g., "home," "mobile," "work," etc.) using the scroll motion(s). Then, the user may selected a desired one of the telephone numbers.

In the logical flow of FIG. 4, one scroll motion results in one forward or one reverse increment through an appropriate list of entries (e.g., alphanumeric characters, contacts, songs, destinations, etc., depending on the operational mode of the electronic device 10). In a variation to the logical flow depicted in FIG. 4, the detection of a scroll motion may initiate automated incrementing through the entries of the appropriate list. For instance, detection of a forward scroll motion may initiate incrementing through the entries of the appropriate list without the detection of subsequent scroll motions. In this manner, the user may make the forward scroll motion and, in response, a forward progression through the list with audio announcement of each item in the list may be made until the select motion or a reverse scroll motion is detected. Similarly, an automatic progression through the list in a reverse direction with audio announcement of each entry may be made upon detection of a reverse scroll motion. Such reverse progression through the list may be broadly considered incrementing, but also may be referred to as "decrementing."

In this alternative to the illustrated logical flow, the speed with which the scroll motion is made, the duration of the scroll motion and/or the range of the scroll motion (e.g., the amount that the user moves the remote control device 12) may determine the rate with which the incrementing operation takes place. For instance, if the user moves the remote control device 12 in a relatively slow manner, the automatic incrementing may be made slowly. This may be desirable if the user is searching for an entry that may be present near the beginning of the list. But if the user moves the remote control device 12 in a relatively fast manner, the automatic incrementing may be made quickly.

As indicated, the described remote control techniques may be used for control operations other than initiating a telephone call. For instance, the technique may be used to scroll through a playlist, song list or artist list and select a desired song or artist for playback. In other operational scenarios, the user may scroll through hierarchical menu options and selected a desired menu item. In another example, the user may enter information for use by a navigation system. For example, a destination address may be "spelled out" by scrolling through a list of alphanumeric characters and selecting desired characters, or the user may scroll through an available list of possible destinations that match a destination category (e.g., the user may scroll through a list of known restaurants and select a desired entry).

In the foregoing embodiments, control inputs are described as being generated by the remote control device 12 and transmitted to the electronic device 10. It will be appreciated that control inputs that are transmitted from the remote control device 12 may be readily identifiable command values or may be unprocessed or partially processed sensor 64 output data that is further processed by the electronic device 10 into command values.

Although certain embodiments have been shown and described, it is understood that equivalents and modifications falling within the scope of the appended claims will occur to others who are skilled in the art upon the reading and understanding of this specification.

What is claimed is:

1. An electronic device that is controlled by movement of a wearable remote control device, wherein the electronic device is a mobile telephone and comprising:

a local wireless interface to receive control inputs from the remote control device, the control inputs including a scroll control input corresponding to a first movement of the remote control device and a select control input corresponding to a
second movement of the remote control device;

a controller that interprets the control inputs and controls the electronic device to carry out a function corresponding to the received control inputs such that at least one scroll control input prompts the controller to scroll through an ordered sequence of entries to increment a corresponding entry value and audibly output the entry value of a
current one of the entries as the entries are incremented; and call circuitry that enables the electronic device to establish a call over a network, and the control inputs are used by the controller to navigate a contact list for initiating a call.

2. The electronic device of claim 1, wherein the at least one received scroll control input prompts the controller to scroll through alphanumeric characters to increment a character value and audibly output corresponding character value feedback as the character value is incremented.

3. The electronic device of claim 2, wherein a received select control input prompts the controller to select a current character value.

4. The electronic device of claim 2, wherein a received select control input prompts the controller to enter the contact list at a point that corresponds to a current character value.

5. The electronic device of claim 4, wherein at least one additional scroll control input prompts the controller to scroll through entries of the contact list and audibly output a name associated with a current contact list entry as the contact list entries are incremented, and receipt of another select control input prompts the controller to initiate a call to a telephone number associated with the selected contact list entry.

6. The electronic device of claim 2, wherein the electronic device further includes an audio file playback function and, in a playback mode, a received select control input prompts the controller to enter one of a playlist, a song list or an artist list at a point that corresponds to a current character value.

7. The electronic device of claim 6, wherein at least one additional scroll control input prompts the controller to scroll through entries of the playlist, the song list or the artist list and audibly output a name associated with a current list value as the entries are incremented, and receipt of another select control input prompts the controller to play an audio file associated with the selected entry.

8. The electronic device of claim 1 the at least one received scroll control input prompts the controller to scroll through entries of a contact list and audibly output a name associated with a current contact list entry as the contact list entries are incremented, and receipt of a select control input prompts the controller to initiate a call to a telephone number associated with the selected contact list entry.

9. The electronic device of claim 1, wherein the electronic device further includes an audio file playback function and, in a playback mode, the at least one received scroll control input prompts the controller to scroll through entries of a playlist, a song list or an artist list and audibly output a name associated with a current list value as the entries are incremented, and receipt of a select control input prompts the controller to play an audio file associated with the selected entry.

10. The electronic device of claim 1, wherein the electronic device further includes a navigation function and, in a navigation mode, received scroll and select control inputs control the navigation function to provide directions to a user-specified destination.

11. The electronic device of claim 1, wherein received scroll and select control inputs are further used, in a non-calling mode, to navigate through a hierarchical menu interface of the electronic device, and the at least one scroll control input prompts an increment through a list of menu options and audible output of feedback data as increments are made through the list.

12. The electronic device of claim 1, wherein the remote control device is worn on an arm or hand of a user.

13. The electronic device of claim 1, wherein the remote control device includes:

one or more motion sensors for detecting motion of the remote control device;

a controller that generates the scroll control input in response to detection of a first movement of the remote control device by the one or more motion sensors and the select control input in response to detection of a second movement of the remote control device by the one or more motion sensors; and a local wireless interface that transmits the scroll control input and the select control input to the electronic device.

14. The electronic device of claim 1, wherein audible outputs in response to received control inputs are played to a user through one of a speaker of the electronic device, a headset or a vehicle audio system.

15. A remotely controlled system in which an electronic device is controlled by the movement of a wearable remote control device, the remotely controlled system comprising: the electronic device of claim 1; and the remote control device for controlling an operational function of the electronic device, the remote control device including:

one or more motion sensors for detecting motion of the remote control device;

a controller that generates a scroll control input for the electronic device in response to detection of a first movement of the remote control device by the one or more motion sensors and a select control input for the electronic device in response to detection of a second movement of the remote control device by the one or more motion sensors; and a local wireless interface that transmits the scroll control input and the select control input to the electronic device.

16. The system of claim 15, wherein the remote control device is worn on an arm or hand of a user.

* * * * *